US 6,712,406 B2

United States Patent
Stojc

(10) Patent No.: US 6,712,406 B2
(45) Date of Patent: Mar. 30, 2004

(54) LOCK LATCH MECHANISM FOR TRANSIT VEHICLE DOOR SYSTEM

(75) Inventor: Andre Stojc, Ile Bazard (CA)

(73) Assignee: Westubggiyse Aur Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/229,582

(22) Filed: Aug. 28, 2002

(65) Prior Publication Data

US 2004/0041413 A1 Mar. 4, 2004

(51) Int. Cl.[7] .................................................. E05C 1/06
(52) U.S. Cl. ............................... 292/144; 292/DIG. 46; 49/116
(58) Field of Search ................................ 292/144, 201, 292/95, DIG. 46; 49/280, 279, 139, 140, 116, 118

(56) References Cited

U.S. PATENT DOCUMENTS

| | | | | |
|---|---|---|---|---|
| 3,455,058 A | * | 7/1969 | Hewitt ........................ 292/140 |
| 4,142,326 A | * | 3/1979 | Schmitz ........................ 49/118 |
| 4,198,786 A | * | 4/1980 | Monot .......................... 49/362 |
| 4,897,959 A | * | 2/1990 | Worden ......................... 49/18 |
| 4,901,474 A | * | 2/1990 | Bayard et al. ............... 292/144 |
| 4,934,488 A | * | 6/1990 | Umemura ..................... 49/116 |
| 5,299,385 A | * | 4/1994 | McConnell .................... 49/18 |
| 6,009,668 A | * | 1/2000 | Reddy .......................... 49/280 |

* cited by examiner

Primary Examiner—Gary Estremsky
(74) Attorney, Agent, or Firm—James Ray & Associates

(57) ABSTRACT

A lock latch mechanism disposed within a powered locking device of a transit vehicle door system for maintaining a lock lever in an unlock position without the aid of the lock actuator. The lock latch mechanism includes a lock latch lever biased for engagement with an unlock cam through the use of a bias spring. The lock latch mechanism further includes a reset lever assembly engaging such lock latch lever during the door closing motion to allow movement of the lock lever form such unlocking position into such locking position to maintain at least one door of the transit vehicle in the fully closed and lock position. A manual release lever is provided to move the lock lever from such locking position into such unlocking position enabling the lock latch mechanism to maintain the lock lever in such unlocked position.

10 Claims, 6 Drawing Sheets

LOCK LATCH MECHANISM FOR TRANSIT VEHICLE DOOR SYSTEM

FIELD OF THE INVENTION

The present invention relates, in general, to passenger transit vehicle door systems and, more particularly, the instant invention relates to passengers transit vehicle door systems having powered door lock mechanisms.

BACKGROUND OF THE INVENTION

Door locks for passenger transit vehicles are a major operational concern inasmuch as they must provide fail-proof locking of the doors in the event of a door mechanism failure to prevent unintentional opening movement of such doors which would permit a passenger to fall out of the vehicle when it is in motion. Yet they must allow for normal door movement upon receipt of the legal open command. It is well known that powered door locks used in the passenger transit door systems utilize a continuous duty independent lock actuator, generally of an electrical, pneumatic, or hydraulic type, engaging a locking member either directly or through an additional linkage to move the locking member into an unlock position. Such locking member generally engages a locking linkage connected to at least one door or a door hanger of a passenger transit vehicle. Such at least one door being in the fully closed and locked position.

Generally, the door is connected to a powered door operator having a prime mover for moving such at least one door in the opening or closing direction. It can be seen from the above discussion that there is a need to enable an independent lock actuator prior to enabling the primary prime mover disposed within a door operator in order to move the at least one door in the opening direction.

Furthermore, the locking member must be maintained in the unlock position for a predetermined amount of time to allow predetermined movement of at least one door in the opening direction and, more particularly, to allow for the locking linkage connected to at least one door to move in the opening direction to clear the locking member and to allow for removal of power to the independent lock actuator.

Generally, a typical passenger transit vehicle includes at least two to as many as twenty four door systems having a powered lock mechanism and sharing one power source. The requirement to enable the independent lock actuator in working cooperation with a primary mover disposed within a door operator increases power consumption and, more particularly, increases the installation and operating costs to provide such increased power consumption for every door opening movement. Thus, it can be seen from the above discussion that there is a need to reduce power consumption during the unlocking phase of the door movement in the opening direction.

Normally, electrical door systems utilize continuous duty type solenoid lock actuators to minimize power consumption during the unlocking motion. These type of solenoid lock actuators are susceptible to frictional forces and misalignment of the lock mechanism due to vibration or other factors and may result in unreliable operation. Therefore, it is desirable to utilize a more powerful, non-continuous duty type solenoid lock actuator to improve reliability of the door unlocking.

To compensate for design and installation tolerances of the door system components typical unlocking mechanisms include a variety of adjustments to compensate for such tolerances. The unlocking situation is exacerbated by the fact that certain permitted lateral movement of the doors in the closed and locked position exists due to overall system tolerances as well as preload between door edges typically used within door systems. Therefore the adjustments are performed after installation of all door system components and usually require several iterations to assure proper operation. Substantial reduction in the need for adjustment further reduces door system installation costs and increases assembly throughput of the passenger transit vehicle.

For reasons of allowing emergency passenger egress when a power source may not be present to drive the doors in the open direction it is desirable for a locking system for a passenger transit vehicle to be unlocked manually therein allowing for subsequent manual door movement toward an open direction.

SUMMARY OF THE INVENTION

The present invention provides a lock latch mechanism disposed within a powered locking device of a transit vehicle door system for maintaining a lock lever in an unlock position without the aid of the lock actuator. The lock latch mechanism includes a lock latch lever spring biased for engagement with an unlock cam through the use of a bias spring means. The lock latch mechanism further includes a reset lever assembly having a pivotably mounted reset lever engaging such lock latch lever during the door closing motion to disengage the lock latch lever form the unlock cam which allows movement of the lock lever from such unlocking position into such locking position to maintain at least one door of the transit vehicle in the fully closed and locked position. A manual release lever is provided to move the lock lever from such locking position into such unlocking position thereby enabling the lock latch mechanism to maintain the lock lever in such unlock position.

OBJECTS OF THE INVENTION

It is therefore one of the primary objects of the present invention to provide a simple and reliable lock latch mechanism for a transit vehicle door system that reduces power consumption during unlocking motion.

Another object of the present invention is to provide a simple lock latch mechanism for a transit vehicle which does not require an independent reset action.

Yet another object of the present invention is to provide a simple lock latch mechanism for a transit vehicle which improves reliability of the unlocking operation.

An additional object of the present invention is to provide a simple lock latch mechanism for a transit vehicle having means to bias the door(s) in the unlocked position.

Yet an additional object of the present invention is to provide a simple lock for a transit vehicle having means to manually unlock at least one door.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
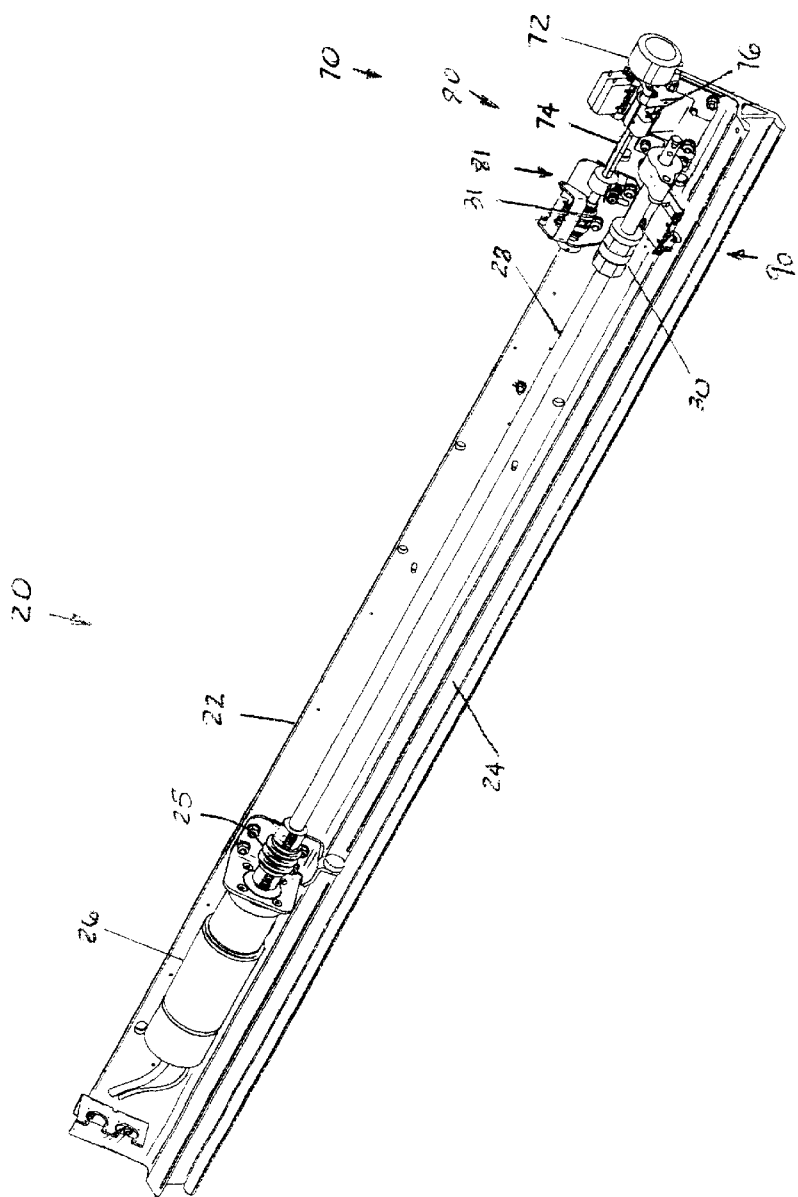
FIG. 1 is a pictorial view of a door operator containing the lock latch mechanism of the present invention.

BRIEF DESCRIPTION OF THE PRESENTLY PREFERRED AND VARIOUS ALTERNATIVE EMBODIMENTS OF THE INVENTION

Prior to proceeding to the more detailed description of the instant invention, it should be noted that identical components which have identical functions have been identified with identical reference numerals throughout the several views illustrated in the drawing figures for the sake and clarity in understanding the invention.

Furthermore, the detailed description of the present invention will be presented on a configuration of bi-parting doors. It will be obvious to those persons who are skilled in the relevant art from that operation of the locking device for a single door will be identical other than the number of additional components associated with a second door.

The invention disclosed herein overcomes application difficulties with locking devices through the use of a lock latch mechanism disposed within a door lock mechanism capable of maintaining the lock lever in the unlock position without the aid of power from the lock actuator. Such lock latch mechanism is resetable during the door closing and locking motion for movement of the lock lever from such unlock position into such lock position.

Figure 2:
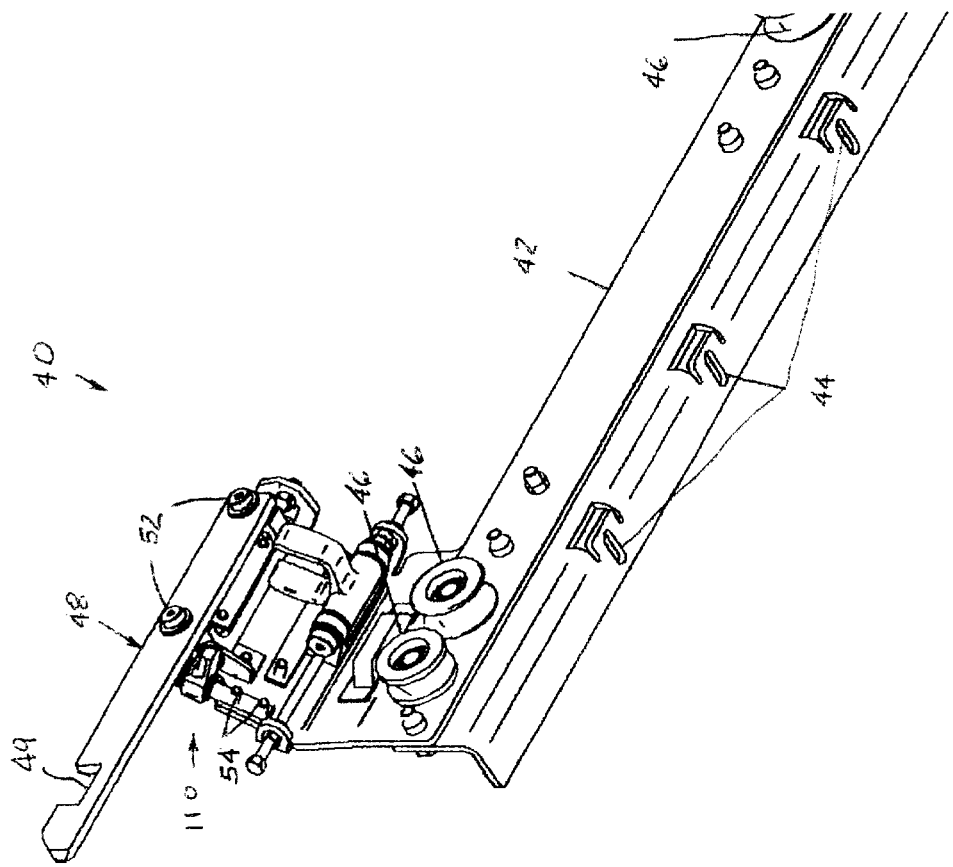
FIG. 2 is a pictorial view of a door hanger assembly containing a reset lever of the present invention.

With respect to FIG. 1 there is shown a pictorial view of the door operator, generally designated 20, comprising a base plate 22 for mounting to the structure of the passenger transit vehicle. A primary mover 26 is attached to the base plate 22. There is a drive member 28 rotatably connected to the prime mover 26 with an universal joint 25. A drive nut 30 engages such drive member 28 to be driven thereby upon rotation of the drive member 28 activated by the primary mover 26. A roller cavity 24 is disposed substantially longitudinally within the base plate 22 for engaging a plurality of rollers 46 disposed within a door hanger assembly, generally designated 40, best shown in FIG. 2.

The hanger assembly 40 further includes a hanger bracket 42, at least one cavity 44 disposed within such hanger bracket 42 for attachment to a first door (not shown). A first lock bar 48 having a lock cavity 49 is attached to the hanger bracket 42 with fasteners 52. Additionally, a second door hanger assembly, generally designated 60, partially shown in FIGS. 3 through 6, is used for attachment to a second door (not shown) of a bi-parting door configuration. There is a reset lever assembly, generally designated 110, attached to hanger bracket 42 with fasteners 54.

In further reference to FIG. 1, there is shown a lock assembly, generally designated 70, comprising a lock actuator 72, of a pneumatic or hydraulic type, but preferably a rotary solenoid, connected to a lock shaft 74 at one end. Such lock shaft 74 is further connected to a manual release lever 31 at the distal end. A lock lever 76 is disposed intermediate the lock actuator 72 and manual release lever 31 for engagement with lock cavity 49 disposed within first lock bar 48 and lock cavity 69 disposed within second lock bar 68.

Figure 3:
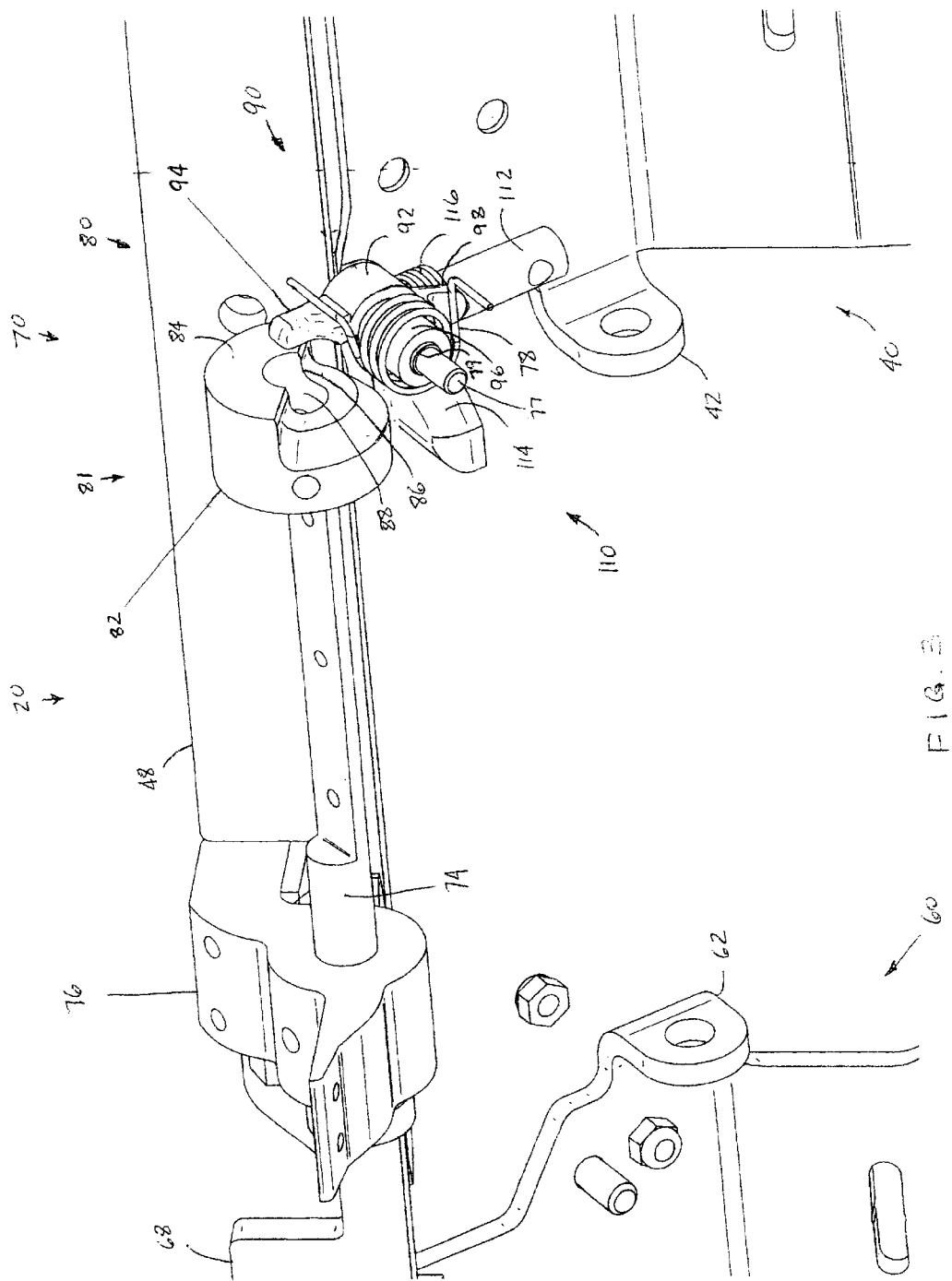
FIG. 3 is a pictorial view of the lock latch mechanism of the present invention, particularly showing orientation of components with the door in a closed and locked position.

In the presently preferred embodiment, lock lever 76 is pivotably connected to lock shaft 74 so that gravity biases it toward the locking position, as shown in FIG. 3. An unlock cam, generally designated 81, is pivotably connected to the lock shaft 74 for maintaining such lock lever 76 in an unlock position during an unlocking motion of the door (not shown).

The details of the lock latch mechanism, generally designated 80, are best shown in FIGS. 3 through 6. It includes the unlock cam, generally designated 81, comprising a cylindrical first surface portion 82, a second surface portion 84 substantially perpendicular to the first surface portion 82 and a cavity 88 disposed within such first surface portion 82. The cavity 88 is disposed perpendicular to such second surface portion 84 and a third surface portion 86 is disposed perpendicular to the second surface portion 84. The third surface portion engages the cavity 88 at the distal end. Such cavity 88 having a predetermined diameter for attachment to lock shaft 74 at one end. Such unlock cam 81 can be manufactured from various types of materials, including steel and aluminum, but preferably, such unlock cam 81 is manufactured from a self-lubricating polymer material to substantially minimize friction upon engagement with a lock latch lever, generally designated 90, pivotably attached to the door hanger assembly 40 at pivot 77.

In the presently preferred embodiment, the pivot 77 is disposed within a self lubricating sleeve 79 to reduce friction forces during rotation of the lock latch lever 90 about pivot 77. Such lock latch lever 90 includes a first surface portion 92, a second surface portion 96 substantially concentric to the first surface portion 92, a detent portion 94 disposed substantially perpendicular to the first surface portion 92 and a reset portion 98 disposed substantially perpendicular to such first surface portion 92. The reset portion 98 is disposed opposite the detent portion 94. A first spring means 78 engages the second surface portion 96 and biases the detent portion 94 for engagement with the unlock cam 81 during an unlocking motion.

In the presently preferred embodiment the first spring means 78 is a coil torsion spring having a predetermined length to apply a predetermined force onto a detent portion 94 for substantial engagement with such unlock cam 81 during an unlocking motion.

The final element of the lock latch mechanism 80, of the instant invention, is a reset lever assembly 110 having a mounting portion 112 attached to such door hanger 42. A reset lever 114 is pivotably attached to such mounting portion 112 and a second spring means 116 engages the mounting portion 112 and further engaging such reset lever 114 to bias the reset lever 114 for engagement with the reset portion 98 during the locking motion.

In the presently preferred embodiment the second spring means 116 is a coil torsion spring having a predetermined length to apply a predetermined force onto the reset portion 98 for disengagement of such detent portion 94 during a locking motion.

Figure 4:
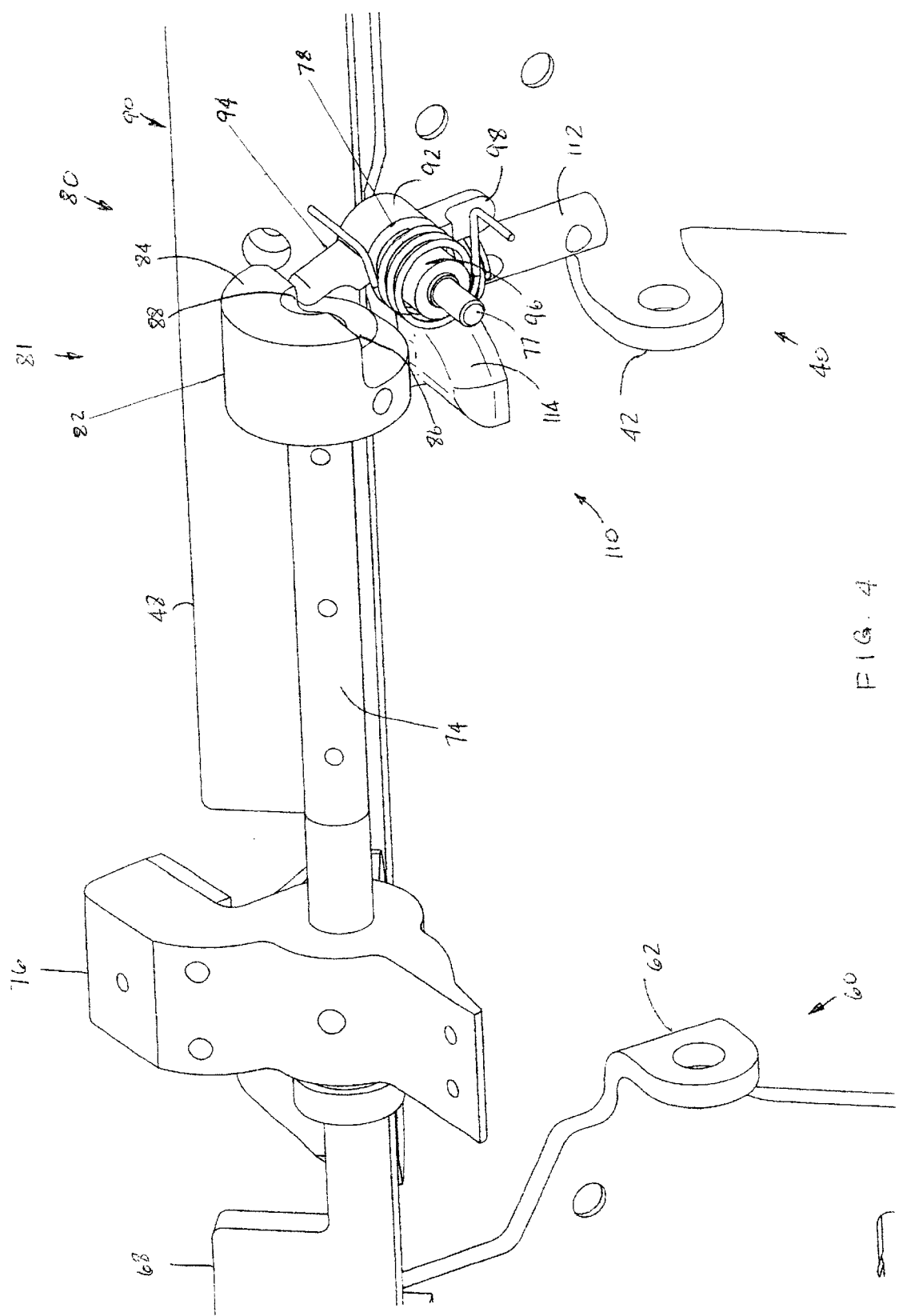
FIG. 4 is a pictorial view of the lock latch mechanism of the present invention, particularly showing orientation of components with the door in a closed and unlocked position.

In further reference to FIG. 3, showing the door hanger assemblies 40 and 60 in a closed and locked position, such lock lever 76 engages such first and second lock bars 48 and 68, respectively. Furthermore, the detent portion 94 engages such unlock cam 81 and is biased toward its second surface portion 84 with first spring means 78. Energization of lock actuator 72 rotates lock shaft 74 causing lock lever 76 to disengage lock bars 48 and 68 and further causing rotation of unlock cam 81. Rotation of the cam 81 causes detent portion 94, biased by first spring means 78, to move about second surface portion 84 engaging third surface portion 86, as best shown in FIG. 4, and further engaging cavity 88, as best shown in FIG. 5.

Such detent portion 94 engages the cavity 88 and prevents the lock lever 76 from reengaging lock bars 48 and 68, thus allowing the solenoid 72 to be de-energized prior to energization of the primary mover 26. A person skilled in the art will recognize that instantaneous energization of the solenoid 72 requires only a pulse of power to unlock the doors (not shown) consuming less energy and preventing such solenoid 72 from overheating. Therefore, a more powerful non-continuous duty type solenoid 72 can be selected and thereby increase the reliability of the unlocking operation.

Figure 5:
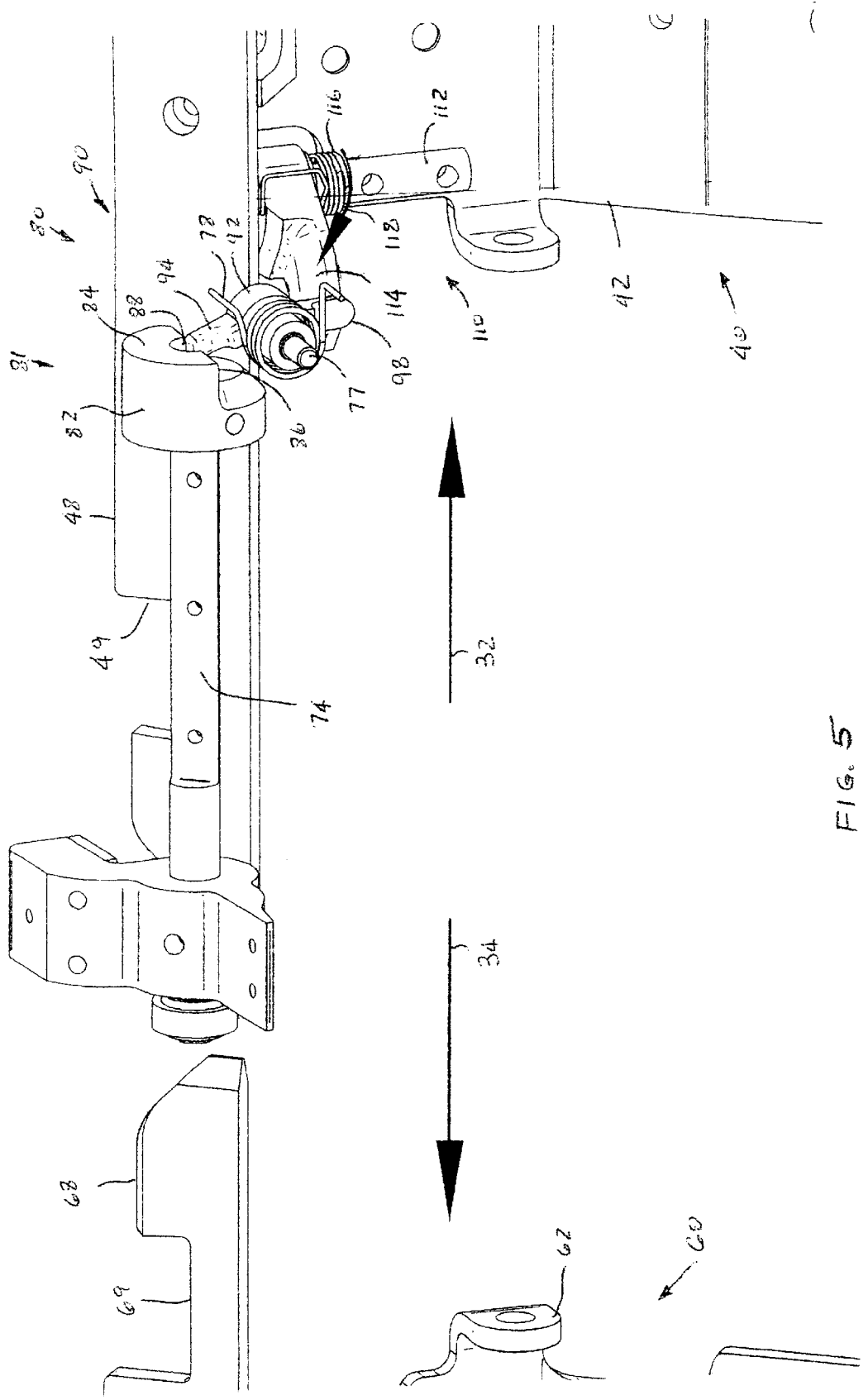
FIG. 5 is a pictorial view of the lock latch mechanism of the present invention, particularly showing orientation of components with the doors at the beginning of the opening movement.

In the door opening sequence as shown in FIG. 5, energization of prime mover 26 causes the first door hanger assembly 40 to move in the opening direction 32 and the second door hanger assembly 60 to move in the opening direction 34. Such movement of the first door hanger assembly 40 causes the reset lever 114 to pivot about mounting portion 112 in the direction 118. Such reset lever 114 further disengages reset portion 98. disposed within the latch lever 90 without pivoting the latch lever 90 about its pivot 77 due to the second spring means 116 biasing such reset lever 114 to pivot in the direction 118.

Figure 6:
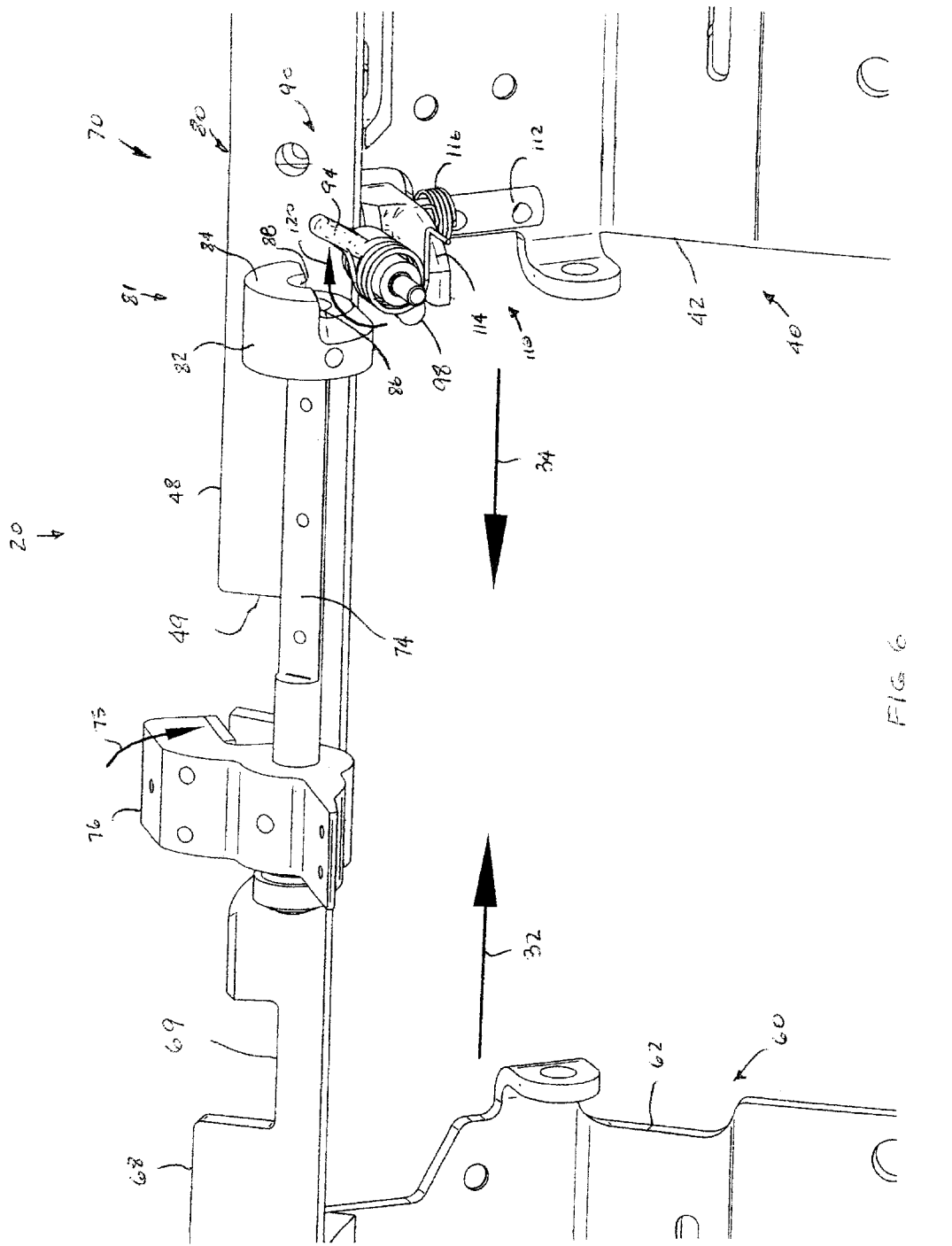
FIG. 6 is a pictorial view of the lock latch mechanism of the present invention, particularly showing orientation of components with the doors at the end of the closing movement.

In the door closing and locking sequence as further shown in FIG. 6, energization of prime mover 26 causes the first door hanger assembly 40 to move in the closing direction 34 and the second door hanger assembly 60 to move in the closing direction 32. Such movement of the first door hanger assembly 40 engages the reset lever 114 with such reset portion 98 causing the reset lever 90 to pivot in the direction 120 disengaging detent portion 94 from the cavity 88 disposed within unlock cam 81. Disengagement of the detent portion 94 will cause lock lever 76 to rotate in the direction 75 and engage first lock bar 48 and second lock bar 68 due to gravity bias and further engaging lock cavities 49 and 69 disposed within such first lock bar 48 and second lock bar 68, respectively. The rotation of the lock lever 76 further causes unlock cam 81 to rotate in the direction 75. Such rotation causing the second portion 84 to engage such detent portion 94, as shown in FIG. 3. A person skilled in the art will recognize that reset of the lock mechanism 70 does not require an independent reset action to dispose components of such lock mechanism 70 from such unlock position into such lock position.

Manual unlocking is enabled by movement of the manual unlock lever 31 causing rotation of such unlock cam 81 to engage detent portion 94 with cavity 88. Furthermore, closing of the (door) either manually, or enabled by prime mover 26, will automatically reset such lock mechanism 70 as discussed above.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art of transit vehicles without departing from the spirit and scope of the invention as set forth in the appended claims.

I claim:
1. A lock latching mechanism, said lock latching mechanism comprising:
   (a) an unlocking cam;
   (b) a lock latch lever engageable with said unlocking cam;
   (c) a reset lever assembly having a mounting portion and a reset lever pivotably attached to said mounting portion, said reset lever assembly engageable with said lock latch lever for disengaging said lock latch lever from said unlock cam, said reset lever assembly enabling rotation of said unlocking cam into a locking position;
   (d) a first spring biasing means engaging said lock latch lever for biasing said lock latch lever into engagement with said unlock cam; and
   (e) a second spring biasing means engaging said reset lever assembly for biasing said reset lever into engagement with said lock latch lever assembly in said locking position.

2. A lock latch mechanism, according to claim 1, wherein said unlocking cam includes:
   (a) a first surface portion;
   (b) a cavity disposed within said first surface portion for mounting to a lock shaft;
   (c) a second surface portion disposed substantially perpendicular to said first surface portion; and
   (d) a third surface portion disposed perpendicular to said second surface portion engageable with said cavity at one end.

3. A lock latch mechanism, according to claim 1, wherein said lock latch lever includes:
   (a) a first surface portion;
   (b) a second surface portion disposed substantially concentric to said first surface portion;
   (c) a detent portion disposed substantially perpendicular to said first surface portion; and
   (d) a reset portion disposed substantially perpendicular to said first surface portion and opposite said detent portion.

4. A lock latch mechanism, according to claim 1, wherein said first spring biasing means is a coiled torsion spring.

5. A lock latch mechanism, according to claim 4, wherein said coil torsion spring has a predetermined length to apply a predetermined force to a detent portion for ensuring substantial engagement with said unlocking cam during an unlocking motion.

6. A lock latch mechanism, according to claim 1, wherein said second spring biasing means is a coiled torsion spring.

7. A lock latch mechanism, according to claim 6, wherein said coil torsion spring has a predetermined length to apply a predetermined force to said reset portion for disengagement of a detent portion during a locking motion.

8. A lock latch mechanism, according to claim 1, wherein said unlocking cam is manufactured from a self-lubricating polymer material.

9. A lock latch mechanism, according to claim 3, wherein said detent portion disposed within said lock latch substantially engages a cavity disposed within said unlocking cam for maintaining said unlocking cam in an unlock position.

10. A lock latch mechanism, according to claim 3, wherein said lock latch mechanism further includes a release lever engageable with said reset portion disposed within said lock latch lever for moving said unlocking cam from an unlock position into such locking position.

* * * * *

UNITED STATES PATENT AND TRADEMARK OFFICE
CERTIFICATE OF CORRECTION

PATENT NO. : 6,712,406 B2 Page 1 of 1
DATED : March 30, 2004
INVENTOR(S) : Andre Stojc It is certified that error appears in the above-identified patent and that said Letters Patent is hereby corrected as shown below:

<u>Title page,</u>
Item [73], Assignee, "Westubggiyse Aur Brake Technologies Corporation" should read: -- Westinghouse Air Brake Technologies Corporation, Wilmerding, PA (US) --
Item [75], Inventors, address "Ile Bazard (CA)" should read -- Ile-Bizard (CA) --.

Signed and Sealed this

Tenth Day of August, 2004

JON W. DUDAS
*Acting Director of the United States Patent and Trademark Office*